United States Patent Office 3,017,282
Patented Jan. 16, 1962

3,017,282
STABLE, AQUEOUS SOLUTIONS OF ORGANIC TITANIUM COMPOUNDS
Harold C. Brill, Cranford, N.J., assignor to E. I. du Pont de Nemours and Company, Wilmington, Del., a corporation of Delaware
No Drawing. Filed Apr. 12, 1957, Ser. No. 652,375
11 Claims. (Cl. 106—287)

This invention pertains to the preparation and use of aqueous solutions of organic, titanium-containing reaction products.

Titanium organic compounds having the

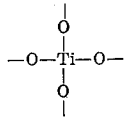

structure as their nucleus are well known compositions of matter. They have been widely discussed in the literature, and quite a number of species are commercially available. Most of these compounds are extremely water-sensitive; i.e., they hydrolyze readily with water, often to the point of decomposition. For example, the lower alkyl titanates, which are probably the best known titanium organics, are easily hydrolyzed to hydrous $TiO_2$ by atmospheric moisture. For this reason, the alkyl titanates are usually handled and stored under anhydrous conditions or maintained as solutions in non-aqueous, organic solvents. This water sensitivity of the alkyl titanates has, of course, restricted the use of these products. Moreover, the presence of organic solvents and the economic necessity for their recovery is impractical for many operations in which alkyl titanates could be used. Because of these deficiencies, there has been a need for aqueous solutions of organic, titanium containing compounds or reaction products which will function in a manner similar to the previously known non-aqueous solutions of titanium organics.

It is therefore an object of this invention to provide new and useful, stable, aqueous solutions of organic titanium-containing reaction products.

This object and others are accomplished by aqueous acidic solutions of a reaction mixture obtained by reacting an alkyl titanate of the formula $Ti(OR)_4$, where R is an alkyl radical, and acetylacetone in the ratio of 1 to 3 mols of acetylacetone for each mol of alkyl titanate. It has been found that when the reaction mixture obtained is contacted with any appreciable amount of water, hydrous $TiO_2$ is precipitated. This invention overcomes such precipitation to form stable, useful solutions. These stable solutions are obtained by adjusting their pH to below 4.5 and preferably between 2.5 and 4.5 by the addition of a water-soluble acid, such as acetic acid or hydrochloric acid. The solutions are useful in the preparation of surface coatings which condition a surface for adhesion with other materials. They are also useful in the production of polymers by the cross-linking of polyhydroxy compounds, such as starch.

In one embodiment, the invention comprises a stable, aqueous solution of a reaction mixture obtained by reacting an alkyl titanate with acetylacetone in the ratio of 1 to 3 mols of acetylacetone for each mol of alkyl titanate comprising by weight about 11–300 parts of said reaction mixture per 100 parts of an aqueous acid selected from the group consisting of formic, acetic, propionic, hydrochloric and sulfuric acid, said solution having a pH of below about 4.5. A preferred concentration range for the reaction mixture is 30–300 parts of the mixture per 100 parts of aqueous acid. A preferred concentration is 100 parts of reaction mixture per 100 parts of aqueous acid. Such solutions can be readily diluted with additional water or with a water-miscible liquid, such as an alcohol, and such dilute solutions can be readily applied in a thin film to surfaces, using the standard equipment for the application of coatings. On simple drying, they leave on the surface a film of material which markedly improves its adhesion with other materials. For example, such a film on paper causes the paper to adhere tenaciously to polyethylene when these two materials are bonded by conventional means, such as heating and pressing. Moreover, when such stable solutions are added to aqueous dispersions of starch, thickening of the starch occurs in a controllable manner.

The alkyl titanate-acetylacetone reaction mixtures are readily prepared by the addition of an alkyl titanate to acetylacetone in the ratio of 1 to 3 mols of acetylacetone for each mol of the titanate. The preferred reacting proportions are 2 mols of acetylacetone to 1 mol of alkyl titanate. Ethyl titanate, propyl titanate and isopropyl titanate are preferred reactants. A reaction takes place spontaneously as evidenced by the development of heat in the solution and the appearance of a certain amount of color. The reaction mixture is a liquid containing an alkyl titanate-acetylacetone reaction product and an alkyl alcohol corresponding to the alkyl groups in the ester used as the reactant. The alcohol can be removed by distillation, but it is preferred to leave it in the solution. When the liquid from the reaction is mixed with pure water, a clear solution appears to be formed at first, but such a solution rapidly becomes cloudy and eventually a substantial quantity of a yellow precipitate forms. This instability is particularly noted in solutions which exceed about 3% concentration of the alkyl titanate-acetylacetone reaction product. However, if the solution is immediately made acid with acetic acid, or other water-miscible acid, to a pH below about 4.5, the resulting solution shows no sign of turbidity on standing for a prolonged period. In making up the solutions, the order of mixing is important if optimum conditions are to be maintained. In order to avoid precipitation during preparation, the reaction mixture should be first prepared and then added to water which has previously been made acidic by the addition of acid. However, it has been found that the alkyl titanate can be added to the aqueous acid solution to form a precipitate, and if acetylacetone is added without delay, the precipitate disappears to produce the stable, aqueous solution of this invention. It is well known that the addition of a tetraalkyl titanate, such as tetraisopropyl titanate, to water results in precipitation of hydrous titanium oxide, and it is highly unexpected that it is possible to cause this precipitate to redissolve by the subsequent addition of an organic compound such as acetylacetone. The fact that such a precipitate redissolves is evidence of the novel character of this invention. A precipitate will also form if the reaction mixture is added to any appreciable quantity of water, but prompt addition of the required amount of acid will redissolve the precipitate and produce the desired, stable solution.

For a clearer understanding of the invention, the following specific examples are given. These examples are intended to be merely illustrative of the invention and not in limitation thereof. Unless otherwise specified all parts are by weight.

*Example I*

284 parts (one mol) of tetraisopropyl titanate is added to 200 parts (two mols) of acetylacetone. On thorough agitation, considerable heat develops in the solution which becomes yellow to brown in color. Agitation is continued until no further heat is developed and then the solution is cooled to approximately room temperature. The reaction mixture thus obtained is a mixture of the tetraisopropyl titanate-acetylacetone reaction product and isopropanol, and it is used in the manner described below. 50 parts of the reaction mixture is added to 50 parts of 3% HCl to give a clear brown solution with a pH of 1.4. This solution will remain stable indefinitely, and it is useful to prepare adhesion promoting solutions and to cross link starch molecules. As a control, 50 parts of the reaction mixture is added to 50 parts of water. The solution has a pH of 5.3, and yellow precipitate is formed within a few minutes.

*Example II*

20 parts of acetylacetone is dissolved in a mixture of 45 parts of water and 5 parts of glacial acetic acid. Under good agitation, 28.4 parts of tetraisopropyl titanate is added to this solution, and agitation is continued for 30 minutes until all of the precipitated solids have redissolved. This solution is then diluted with 450 parts of water and 450 parts isopropyl alcohol. An aluminum panel is dipped approximately half way into this solution and allowed to drain. It is then cured by hanging in an oven maintained at 100° C. for 15 minutes. Subsequently, a 10 mil thick strip of polyethylene film is bonded to one side of the panel in a heated press, using 10 lbs. per square inch pressure at 150° C. The panel was removed from the press and allowed to stand at room temperature (25° C.) for one hour. This panel was then tested for the effectiveness of the adhesion between the polyethylene layer and the aluminum by attempting to peel the layer from the metal panel. A pull of 2 lbs. per linear inch (calculated from the width of the polyethylene layer and the force required to peel off the layer) removed the layer from the untreated portion of the panel whereas it required a pull of 8 lbs. per linear inch to loosen the layer from the treated portion of the panel.

*Example III*

284 parts (one mol) of tetraisopropyl titanate is added to 200 parts (two mols) of acetylacetone. On thorough agitation considerable heat develops in the solution which becomes yellow to brown in color. Agitation is continued until no further heat is developed and then the solution is cooled to approximately room temperature. 50 parts of the reaction mixture thus obtained is added to 50 parts of a 10% solution of acetic acid in water to give a clear brown solution having a pH of about 4.1. This stable solution is further diluted with 580 parts of isopropanol (95% purity). A thin film of this solution is applied to a "Mylar" polyester film using a gravure press. The film is then passed through a tunnel drier to evaporate the solvent and to cure the titanium-containing reaction product which has been coated on it. The actual conditions in the tunnel drier approximate a contact time of about 30 seconds at a temperature of about 105° C. Subsequently, polyethylene is extrusion laminated to the treated side of the polyester film. The resultant laminate has a superior bond when compared to a similar laminate prepared without the use of the titanium-containing reaction product as an adhesion promoter. This superiority is demonstrated by immersing test strips of the respective films in boiling water. The laminate prepared without the use of the adhesion promoter starts to separate within one minute in boiling water and is completely separated within about 5 minutes. On the other hand, the laminate prepared with the adhesion promoter shows no signs of separation after 15 minutes in boiling water.

*Example IV*

228 parts (one mol) of tetraethyl titanate is added to 300 parts (three mols) of acetylacetone. On thorough agitation, some heat develops in the solution together with an appreciable amount of color. Agitation is continued until no further heat is developed, and then the solution is cooled approximately to room temperature and added to 500 parts of a 10% acetic acid solution in water to give a clear stable reaction mixture. This stable solution is further diluted with 5800 parts of ethyl alcohol (95% purity) and the resulting solution is applied in a thin film to a "Mylar" polyester film in the manner described in Example III. A laminate with polyethylene is prepared from this treated "Mylar" film, and it has excellent resistance to separation when tested by immersion in water as described in Example III.

*Example V*

100 parts of the tetraisopropyl titanate-acetyl-acetone reaction mixture prepared as in Example I is dissolved with good agitation in 100 parts of 10% acetic acid solution in water. 4 parts of the aqueous solution thus obtained is added to 20 parts of oxidized starch in 80 parts of water. There is a marked increase in viscosity of the starch solution on this addition. A film of this treated starch solution and a film of a separately prepared, untreated starch solution are laid down on glass panels using an applicator which gives a wet film of approximately 5 mils thickness. These films are allowed to air dry for 16 hours at room temperature. The dried films are then soaked in water for 3 minutes whereupon the untreated starch film readily dissolves from the glass panel. On the other hand, the film prepared from the starch solution treated with the aqueous solution of the tetraisopropyl titanate-acetylacetone reaction product softens slightly but does not dissolve from the glass. This marked change in water resistance indicates that cross-linking of the starch is accomplished by the addition of the aqueous solution of the retction product. In addition to the improved water resistance of the simple supported film, the treated starch solution is an effective adhesive material exhibiting much better water resistance than an untreated starch adhesive.

*Example VI*

A stable aqueous solution of tetraisopropyl titanate-acetylacetone reaction mixture is prepared by mixing together 284 parts (one mol) of tetraisopropyl titanate and 200 parts (two mols) of acetylacetone according to the procedure of Example I. The mixture is agitated and heat is evolved. When no further heat develops, the agitation is stopped and the solution is cooled to room temperature. Equal parts of the mixture thus obtained and a 10% solution of acetic acid are mixed to give the desired aqueous solution of the titanium-containing reaction product. The solution was then used as a cross-linking agent for polyvinyl alcohol. Two parts of the solution are added with agitation to 5 parts of polyvinyl alcohol ("Elvanol 72–60"—Du Pont) dissolved in 93 parts of water and 2 parts of glycerin as a plasticizer. There is a noticeable increase in viscosity, but the solution remains readily workable. This solution is then used as an adhesive to bond two pieces of kraft paper together. For purposes of comparison an untreated control solution of the polyvinyl alcohol (5 parts polyvinyl alcohol; 93 parts water, and 2 parts glycerin) is used in a like manner to bond two pieces of kraft paper together. When dry, both adhesives have good strength. However, after drying several hours at room temperature, test strips of the bonded papers are immersed in water for one minute and then tested for strength of bond. The strip prepared using the untreated polyvinyl alcohol adhesive comes apart readily. However, the strip prepared using the treated polyvinyl alcohol adhesive does not come apart at all, but the effort to separate the strips results in tearing of the paper instead of separation. This reduction in water sensitivity of the adhesive is evidence of cross-linking of the polyvinyl alcohol as a result of the addition of the aqueous acid solution of the tetraisopropyl titanate-acetylacetone reaction product.

Example VII 100 parts of tetraisopropyl titanate-acetylacetone reaction mixture prepared as in Example I is added to 100 parts of 5% acetic acid solution in water to give a stable brown solution which is then further diluted with 1452 parts of water. A thin film of this stable solution is then applied to a continuous web of cellophane (viscose) film using a gravure press. The film is passed through a tunnel drier at about 80° C. to remove solvent and to cure the adhesion promoting film on its surface. Subsequently, a thin film of polyethylene is extrusion coated on to the treated side of the cellophane film. The resultant laminate has a much stronger bond than a similar laminate prepared by extruding polyethylene on to untreated cellophane.

Example VIII

This example is presented to show how the order of mixing affects the preparation of the solution.

(a) 50 parts of tetraisopropyl titanate-acetylacetone reaction mixture, as prepared in Example I, is added to 45 parts of water with good agitation giving a clear solution in which a precipitate soon begins to form. On the prompt addition of 5 parts of glacial acetic acid, the precipitate redissolves to give a clear solution of good stability.

(b) 20 parts of acetylacetone is added to 48 parts of 5% HCl in water. To this solution is added with good agitation 28 parts of tetraisopropyl titanate. A clear brown solution results which is stable indefinitely.

(c) 20 parts of acetylacetone is added to 48 parts of 5% acetic acid in water followed by the addition of 28 parts of tetraisopropyl titanate under good agitation. Although a yellow-white precipitate forms at once, it gradually redissolves to yield a clear solution of good stability and comparable in properties to the solutions obtained by the separate preparation of the alkyl titanate-acetylacetone reaction mixture and its subsequent solution in the dilute acid.

(d) 28 parts of tetraisopropyl titanate is added to 48 parts of a 3% solution of HCl in water whereupon a white precipitate forms at once. However, when 20 parts of acetylacetone is added immediately after the formation of the white precipitate, the precipitate redissolves on stirring to give a clear solution of good stability of substantially the same properties as those prepared in the other examples above.

The preferred alkyl titanate-acetylacetone reaction mixture contains the tetrapropyl titanate-acetyl-acetone reaction product in admixture with isopropanol. This reaction mixture can, however, be made from any available tetraalkyl titanate. For most of the contemplated uses of my novel solutions it is convenient to use a lower-alkyl titanate so that the by-product alcohol produced in the reaction is one having a relatively low boiling point. This procedure makes for ready evaporation of the alcohol when the reaction mixture is used in a coating composition. Tetrabutyl titanate, tetra-n-propyl titanate, tetraethyl titanate, and tetraisopropyl titanate are examples of the lower-alkyl titanates contemplated. It is not necessary for the purposes of this invention that the alkyl titanate-acetylacetone reaction product be used in admixture with the alcohol formed during its preparation. Since the alcohol does no harm, it is more practical to allow it to remain with the reaction product. However, it is entirely possible to remove this alcohol by suitable distillation techniques to obtain the separated alkyl titanate-acetylacetone reaction product. This product is also miscible with water, but shows almost immediate precipitation therein unless the solution is stabilized by the adjustment of the pH below about 4.5 as described heretofore. The separated alkyl titanate-acetylacetone reaction product may be used in the solutions of this invention in the same amount as the unseparated reaction mixture.

It is believed that when one mol of alkyl titanate is reacted with 2 mols of acetylacetone

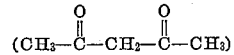

two of the alkoxy groups on the titanium ester are replaced by two chelating

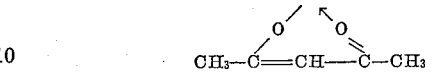

groups to form a reaction product which might properly be called titanium acetylacetonate. In a concentration above 2% or 3%, this reaction product is unstable in water as shown in Example I. The reaction of either more or less than 2 mols of acetylacetone is not as thoroughly understood, but with less than two mols of the beta diketone a proportionate number of alkoxy groups are replaced. When more than two mols of acetylacetone are used, it is believed that additional alkoxy groups are replaced; but since the titanium coordination sphere is already filled, further chelation cannot occur. There is evidence that as much as 4 mols of acetylacetone will react with a mol of titanium ester. It is also pointed out that the claimed solutions may contain excess acetylacetone without any harmful effect. Therefore, the aqueous acid solutions of this invention may contain excess acetylacetone, by-product alcohol or water-miscible alcohols which are purposely added. In obtaining the stable solutions of this invention, the examples have shown the use of acetic acid and hydrochloric acid. When the solutions are to be diluted to adhesion-promoting solutions, it is highly desirable that the acid used be one which is readily volatile under the conditions of curing the applied films. However, when they are used as cross-linking agents, this feature is not absolutely essential. Acids, such as formic acid, and propionic acid, can be used with equal facility to those already shown. Sulfuric acid also gives stable solutions which are useful as cross-linking agents.

It is essential to this invention that the pH of the solution be less than about 4.5 for satisfactory stability. The preferred pH seems to be in the range of about 2.5 to 4.5, but solutions with a pH as low as 1.0 are useful.

The preferred reacting ratio for the alkyl titanate and the acetylacetone is 2 mols of acetylacetone to 1 mol of titanium ester. Example IV shows the use of 3 mols of acetylacetone, and equally stable solutions are prepared by such a process. On the other hand, it is also possible to prepare stable solutions from reaction mixtures obtained from a reaction between 1 mol of acetylacetone per mol of titanium ester.

While the preferred reaction mixtures and reaction products are prepared from alkyl titanates and acetylacetone, similar stable solutions can be prepared from the alkyl titanates and other beta-dihydroxy and beta-diketone compounds. Thus, corresponding stable solutions may be formed from the reaction product of tetraisopropyl titanate with such compounds as benzoylacetone, diacetone alcohol, beta-ketobutanol, acetoacetic ester and the like.

When a stable solution has once been prepared with a pH in the range shown, it is possible to dilute it further with either water or with an alcohol without any significant loss of stability as far as practical use of such a solution is concerned. It is noted that the actual use of solutions in the preparation of adhesion promoters is best done from such diluted solutions, and both dilution with alcohol and with water is shown in the examples above.

The novel solutions shown in this invention make it possible to utilize many of the valuable properties of the titanium esters without the difficult problems associated with the anhydrous conditions which have previously been necessary for the effective utilization of these properties. This is particularly true with respect to the laying down of a thin film of a titanium-containing compound on a

I claim:

1. A stable aqueous solution of a reaction mixture obtained by reacting a lower alkyl titanate with acetylacetone in the ratio of 1 to 3 mols of acetylacetone for each mol of alkyl titanate consisting essentially of by weight about 11–300 parts of said reaction mixture per 100 parts of an aqueous acid selected from the group consisting of formic, acetic, propionic, hydrochloric and sulfuric acid, said solution having a pH of below about 4.5.

2. A stable aqueous solution of a reaction mixture obtained by reacting a lower alkyl titanate with acetylacetone in the ratio of 2 mols of acetylacetone for each mol of alkyl titanate consisting essentially of by weight about 100 parts of said reaction mixture per 100 parts of an aqueous acid selected from the group consisting of formic, acetic, propionic, hydrochloric and sulfuric acid, said solution having a pH of below about 4.5.

3. A stable aqueous solution of a reaction mixture obtained by reacting an alkyl titanate selected from the group consisting of tetraethyl titanate, tetra-n-propyl titanate and tetraisopropyl titanate with acetylacetone in the ratio of 2 mols of acetylacetone for each mol of alkyl titanate consisting essentially of by weight about 11–300 parts of said reaction mixture per 100 parts of aqueous acetic acid, said solution having a pH between 2.5 and 4.5.

4. A stable aqueous solution of a reaction mixture obtained by reacting an alkyl titanate selected from the group consisting of tetraethyl titanate, tetra-n-propyl titanate and tetraisopropyl titanate with acetylacetone in the ratio of 2 mols of acetylacetone for each mol of alkyl titanate consisting essentially of by weight about 11–300 parts of said reaction mixture per 100 parts of aqueous hydrochloric acid, said solution having a pH between 1 and 4.5.

5. A stable aqueous solution of a reaction product obtained by reacting a lower alkyl titanate with acetylacetone in a ratio of 1 to 3 mols of acetylacetone for each mol of alkyl titanate and then removing the by-product alkyl alcohol, said solution consisting essentially of by weight about 11–300 parts of said reaction product per 100 parts of an aqueous acid selected from the group consisting of formic, acetic, propionic, hydrochloric and sulfuric acid, said solution having a pH of below about 4.5.

6. A stable aqueous solution of a reaction mixture obtained by reacting a lower alkyl titanate with acetylacetone in the ratio of 1–3 mols of acetylacetone for each mol of alkyl titanate consisting essentially of by weight about 11–300 parts of said reaction mixture per 100 parts of an aqueous acid, said solution having a pH below about 4.5.

7. A process for the preparation of stable aqueous solutions of a reaction mixture obtained by reacting a lower alkyl titanate with acetylacetone which consists essentially of mixing said alkyl titanate with acetylacetone in a ratio of 1–3 mols of acetylacetone for each mol of alkyl titanate to obtain a reaction mixture, then adding said reaction mixture to an aqueous acid in the proportions of 11–300 parts of said mixture per 100 parts of acid, said acid being of a strength to give the final solution a pH below about 4.5.

8. A stable aqueous solution of a reaction mixture obtained by reacting a lower alkyl titanate with acetylacetone in the ratio of 1 to 3 mols of acetylacetone for each mol of alkyl titanate consisting essentially of by weight about 30–300 parts of said reaction mixture per 100 parts of an aqueous acid selected from the group consisting of formic, acetic, propionic, hydrochloric and sulfuric acid, said solution having a pH of below about 4.5.

9. A stable aqueous solution of a reaction product obtained by reacting a lower alkyl titanate with acetylacetone in a ratio of 1 to 3 mols of acetylacetone for each mol of alkyl titanate and then removing the by-product alkyl alcohol, said solution consisting essentially of by weight about 11–300 parts of said reaction product per 100 parts of an aqueous acid, said solution having a pH of below about 4.5.

10. A stable aqueous solution of a reaction product obtained by reacting in the ratio of 1 to 4 mols of acetylacetone with 1 mol of a lower alkyl titanate, said solution having present therein an aqueous acid in an amount sufficient to maintain the pH of the solution below about 4.5.

11. A stable aqueous solution of a reaction product obtained by reacting in the ratio of 1 to 4 mols of acetylacetone with 1 mol of a lower alkyl titanate, said solution having present therein an aqueous acid selected from the group consisting of formic, acetic, propionic, hydrochloric and sulfuric acid, in an amount sufficient to maintain the pH of the solution below about 4.5.

References Cited in the file of this patent

UNITED STATES PATENTS

| | | |
|---|---|---|
| 1,255,807 | Spence et al. | Feb. 5, 1918 |
| 2,156,918 | Lyons | May 2, 1939 |
| 2,621,195 | Haslam | Dec. 5, 1952 |
| 2,680,108 | Schmidt | June 1, 1954 |
| 2,870,181 | Shacklett | Jan. 20, 1959 |
| 2,894,966 | Russell | July 14, 1959 |
| 2,898,356 | Russell | Aug. 4, 1959 |

FOREIGN PATENTS

| | | |
|---|---|---|
| 734,113 | Great Britain | July 27, 1955 |